United States Patent
Oster et al.

(10) Patent No.: US 7,844,751 B2
(45) Date of Patent: Nov. 30, 2010

(54) DATA TRANSMISSION AND PROCESSING SYSTEM WITH RELIABLE ACQUISITION OF CRITICAL STATES

(75) Inventors: Viktor Oster, Blomberg (DE); Joachim Schmidt, Horn-Bad Meinberg (DE); Steffen Horn, Schieder-Schwalenberg (DE)

(73) Assignee: Phoenix Contact GmbH & Co. KG (DE)

( * ) Notice: Subject to any disclaimer, the term of this patent is extended or adjusted under 35 U.S.C. 154(b) by 204 days.

(21) Appl. No.: 12/282,711

(22) PCT Filed: Mar. 3, 2007

(86) PCT No.: PCT/EP2007/001837

§ 371 (c)(1),
(2), (4) Date: Dec. 18, 2008

(87) PCT Pub. No.: WO2007/104440

PCT Pub. Date: Sep. 20, 2007

(65) Prior Publication Data

US 2009/0222595 A1  Sep. 3, 2009

(30) Foreign Application Priority Data

Mar. 15, 2006 (DE) .................. 10 2006 012 275

(51) Int. Cl.
*G06F 3/00* (2006.01)
(52) U.S. Cl. .............................. 710/15; 710/18; 710/19
(58) Field of Classification Search ............ 710/15, 710/18, 19
See application file for complete search history.

(56) References Cited

U.S. PATENT DOCUMENTS 5,367,555 A * 11/1994 Isoyama .................. 379/38

(Continued)

FOREIGN PATENT DOCUMENTS

WO  01/50677 A1  7/2001

OTHER PUBLICATIONS

Yolaine Cussac, "International Application No. PCT/EP2007/001837 International Preliminary Report on Patentability", Nov. 13, 2008, Publisher: PCT.

*Primary Examiner*—Alford W Kindred
*Assistant Examiner*—David E Martinez
(74) *Attorney, Agent, or Firm*—DeMont & Breyer, LLC

(57) ABSTRACT

Data transmission and processing system with at least one input user (1), with a control unit (4) for the reception and the processing of data of the input user (1) and a transmission device (3) of data between the input user (1) and the control unit (4). The input user (1) cyclically makes available the input data values ($Z_0, Z_1 \ldots Z_X$) for retrieval, and the transmission device (3) cyclically calls up the input data values ($Z_0, Z_1 \ldots Z_X$) and transfers them to the control unit (4), to be sent after processing to at least one output user (2). A parameterization device (5) with a monitoring switch (12, 15) is provided at the input user (1) to mark the input data values that characterize critical states as critical data values ($FZ_1$). In the case of the presence of such critical states, only the associated critical data values ($FZ_1$) are made available henceforth for transfer and are transmitted until it has been determined with certainty that the control unit (4) has received the critical data values ($FZ_1$).

19 Claims, 3 Drawing Sheets

U.S. PATENT DOCUMENTS

Figure 1:
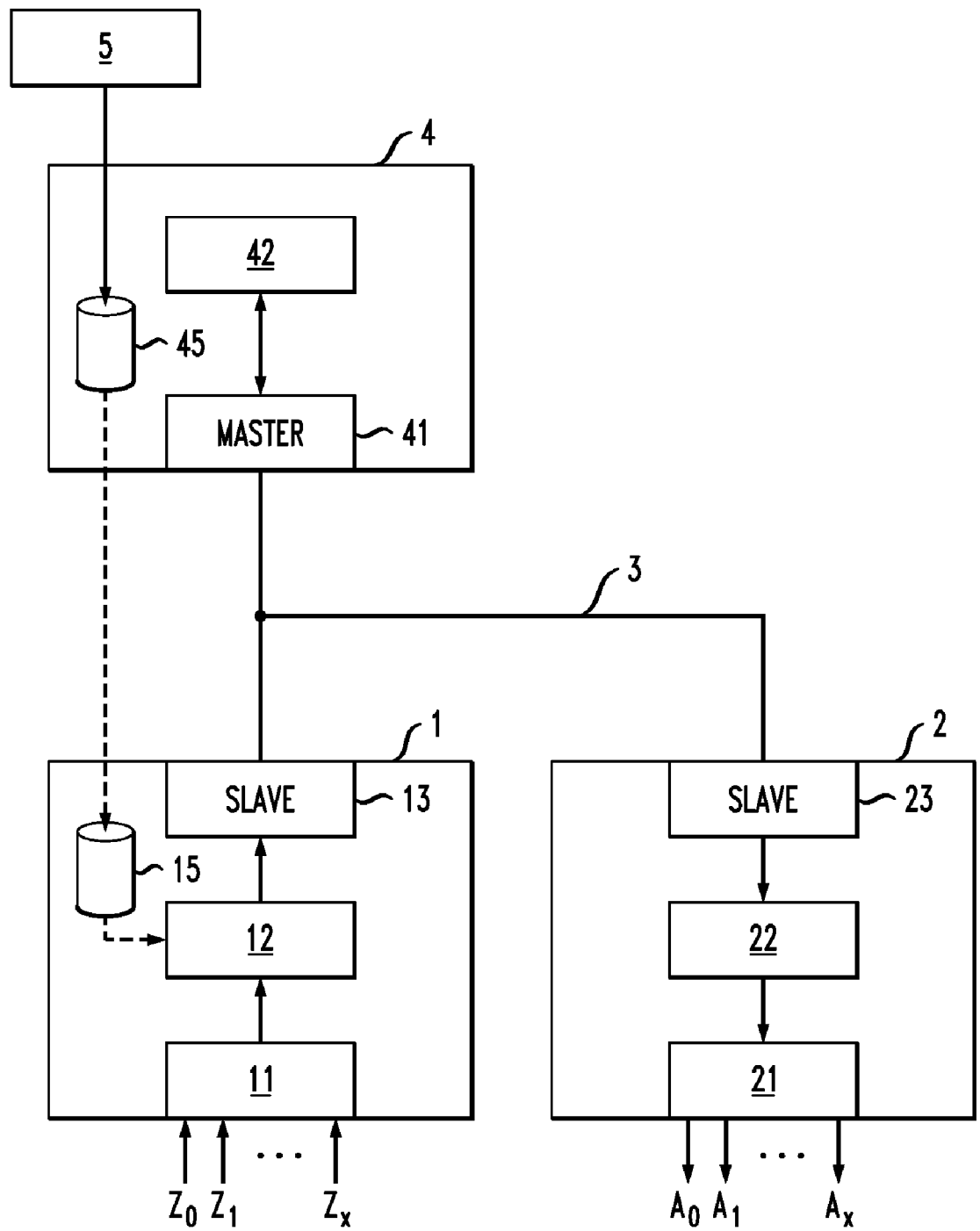

| | | |
|---|---|---|
| 5,784,547 A | 7/1998 | Dittmar et al. |
| 7,039,507 B2 * | 5/2006 | Hagenbuch .................. 701/29 |
| 2003/0135686 A1 | 7/2003 | Vorbach et al. |
| 2006/0164987 A1 * | 7/2006 | Ruiz Floriach et al. ...... 370/235 |

* cited by examiner

DATA TRANSMISSION AND PROCESSING SYSTEM WITH RELIABLE ACQUISITION OF CRITICAL STATES

The invention relates to a data transmission and processing system that comprises at least an input user, a control unit for receiving and processing data, and a data transmission device between the input user and the control unit. The input user forms cyclical data values that are transmitted to the control unit, where they are transmitted as output data values to an output user. The invention also relates to a method for ensuring the reliable processing of critical states.

Process controllers present a central control unit and a plurality of decentralized field devices, which are interconnected via a bus system. In the field devices, one can distinguish between input field devices that collect, for example, measured values, and output measurement devices that issue, for example, actuator control signals. The input field device can be constructed in such a way that it cyclically receives data values and delivers these received data to the control unit via a bus system. When the number of bus users is very high, an individual input field device, as bus user, succeeds in transmitting the already available data to the control unit only for a short cycle time. If the input data of the field device change more rapidly than the bus system is capable of collecting these data values, data loss occurs. The same applies if the input data are applied for only a short time to a bus system that is too slow.

In process control, it is important to rapidly and precisely acquire the measurement values that describe a process state. In safety engineering in particular, the loss of a measured state that relates to a safety requirement must not occur. However, also in standard technology, input data may exist which, although they are applied for only a short time, must nevertheless absolutely be processed in the controller. In such cases, increased demands are placed on the transmission system, i.e., bus systems with increased transmission speed have to be used, or the number of bus users must be reduced. It may also be necessary to use a more rapid control system.

The invention is based on the problem of producing a data transmission and processing system with at least one input user or field device, a control unit, and a transmission device, in which critical data values that concern the critical states of the field device are transmitted with great dependability to the control unit.

The problem posed is solved by the characteristics and measures as indicated in the claims.

In detail, the data transmission and processing system comprises besides the at least one input user or field device, the control unit, and the transmission device, also a parameterization device that is effective on the at least one input user or field device, to mark certain data values as critical states. When such critical states occur and are detected by the input user or field device as critical data values, then those critical data values are made available for transmission until it is determined with certainty that these critical data values have been transmitted to the controller. This can occur in different ways. The controller can confirm by an acknowledgment signal that the data transmission has occurred. It is also possible to manage without an acknowledgment signal if the transmission device (particularly a bus system), upon a safety requirement, increases the time of availability of the data in the secure input device. The measures that are taken between the input user and the control unit can also be used accordingly between the control unit and small output parts.

Figure 2:
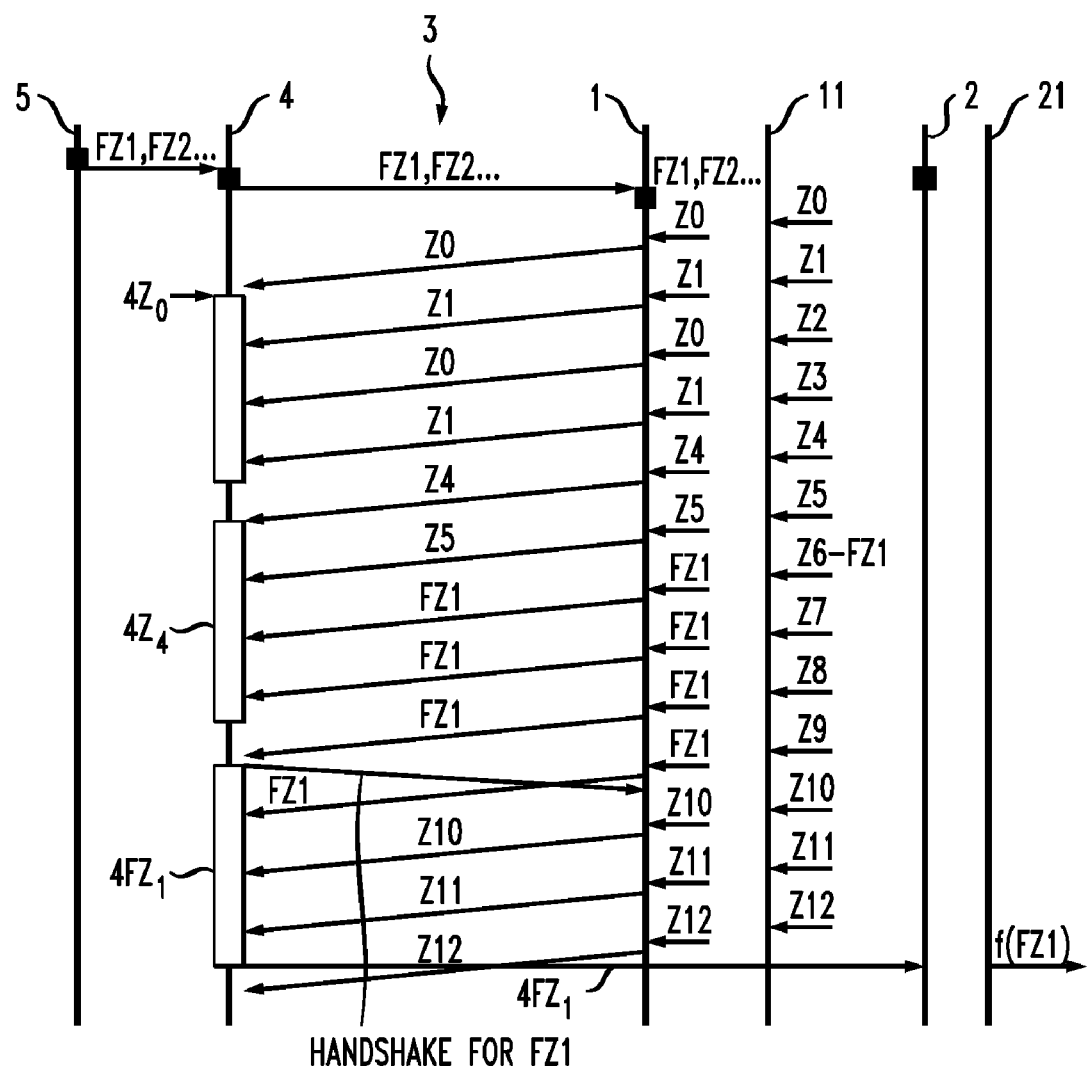
Figure 3:
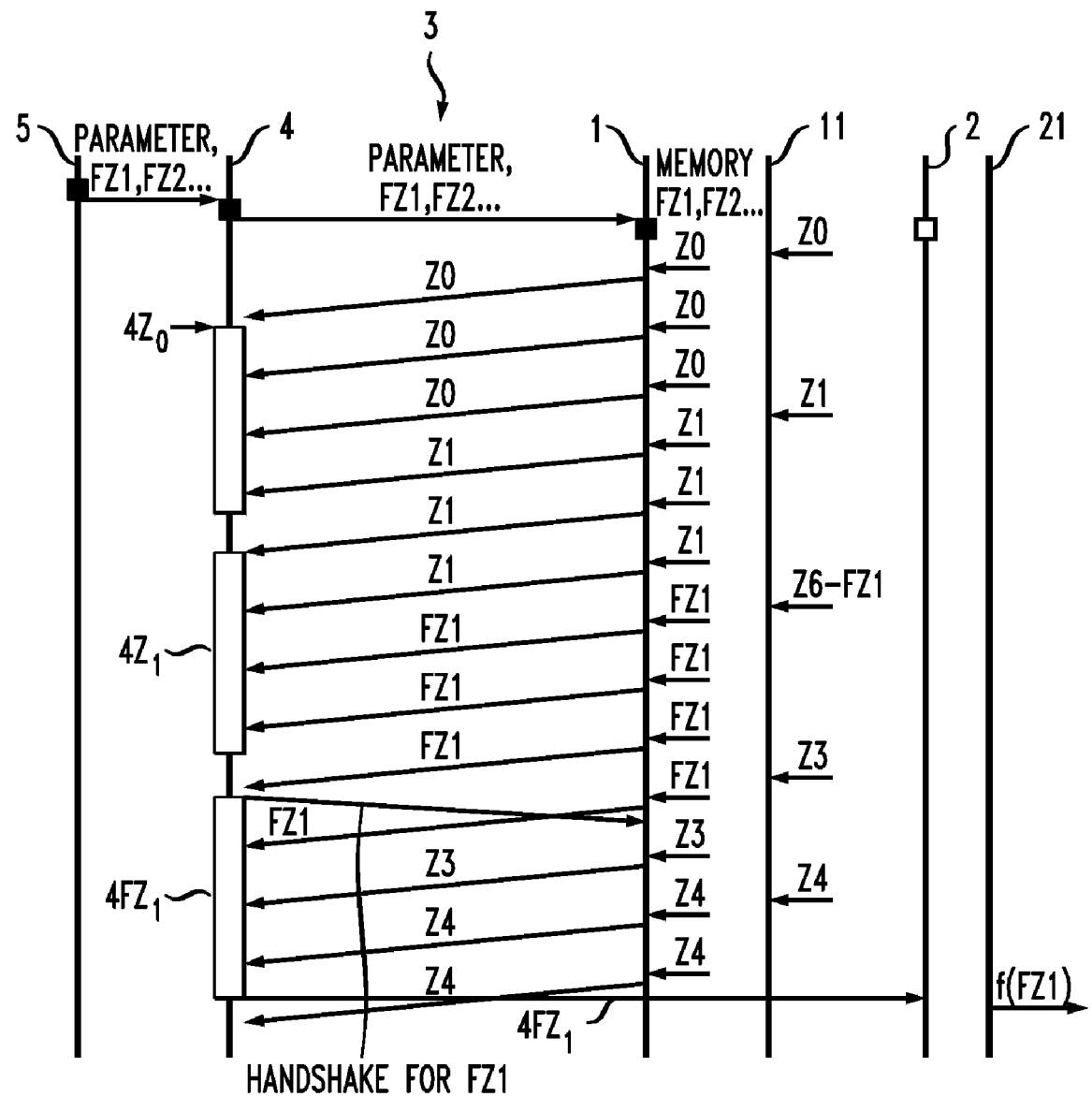

An embodiment example of the invention is described with reference to the drawings. In the drawings:

FIG. 1 shows a structural illustration of a data transmission and processing system, FIG. 2 shows a first operating scheme, and FIG. 3 shows a second operating scheme.

The data transmission and processing system comprises a series of field devices, of which one input field device is represented as an input user 1, and one output field device is represented as an output user 2. A bus 3 forms a data transmission device between the field devices and the control unit 4. Furthermore, parameterization means 5 are also provided, which make available parameterization values during the processing of data in the field device 1 and the control unit 4.

The field device 1 presents an input memory 11, a processing logic 12 and a slave switch-on unit 13. Furthermore, a memory 15 for special parameterization data is provided. The input memory 11 is provided to read in input data $Z_0, Z_1$ to $Z_X$ cyclically, where the input data form the conditions to be monitored. The input data are processed in a processing logic 12 and in the process compared with the parameter data sets of the memory 15. The input data that are to be processed in this way are transmitted to the slave switch-on unit 13 and are made available for transmission through the transmission device 3.

The expression "memory for parameterization data" should be understood very generally and it does not comprise only "software" for programmable memories, but also "firmware" that can also be included in the processing logic 12. Here, the input data $Z_0, Z_1 \ldots Z_x$ can be in digital form, and the critical data, which concern the critical states, could present a specific address field, for example, with a zero.

The control unit 4 comprises a master switch-on unit 41, a processing logic 42, and a memory 45 for parameterization data. The master switch-on unit 41 is connected to slave switch-on unit 13 via the transmission device 3 and receives data values of the input data $Z_0$ to $Z_x$. The data values are processed in the processing logic 42 to control commands, which are called the output data $A_0, A_1 \ldots A_x$, and are directed via the transmission device 3 to the field device 2.

The output field device 2 is constructed symmetrically with respect to the input field device 1 and comprises an output memory 21, a processing logic 22 and a slave switch-on unit 23. As one can see, the data flow direction in the field device 2 is reversed compared to that in the field device 1.

The input field device 1 and the output field device 2 can be combined with each other with the shared use of the slave switch-on unit 13/23 and the processing logic 12/22 in a field device 1/2, where only the input switches 11 and the output switches 21 are separate from each other, to be controlled in accordance with their function.

The parameterization device possesses a central memory for all the parameterization data, and it is assumed that the memory 45 of the control unit 4 is used as this central memory. From the central memory, special parameterization data are directed to and stored in the individual input field devices for use during the operation of the data transmission and processing system. The parameterization data can be stored as bit combinations.

The operating process of the data transmission and processing system is explained in reference to the schema of FIGS. 2 and 3. The uppermost, horizontal line indicates the apparatus parts from FIG. 1. The vertical lines represent, in a manner of speaking, time axes. It is assumed that, using the stored parameter values, a reliable control program can be established for the controller 4. Then the user defines, with the help of the parameterization device, the critical states $FZ_1$, $FZ_2 \ldots$, which concern the secure input user or the field device 1. With the start of the system, the secure input user or the field device 1 cyclically reads the input data $Z_0, Z_1 \ldots Z_x$ into the input memory 11. These data are transmitted to the control unit 4, as represented by the drawn-in arrows between the column 1 of FIGS. 2 and 3, respectively, and the column 4. With the arrival of the data values $Z_0$, the control unit 4 starts a cyclic control program $4Z_0$, which is symbolized by a rectangle along the line 4.

In the operating scheme of FIG. 2, the acquisition of the input data is synchronized with the bus 3, while the control program of the control unit 4 is carried out asynchronously with respect to the bus 3. In the represented case the control program lasts longer than the temporal separation between the individual input data. This means that the input data $Z_1, Z_2$ and $Z_3$ remain not taken into account. With the arrival of the input data $Z_4$, a new control program $4Z_4$ is started. The input data $Z_6$ arrive with temporal overlap at the input user 1, and they signal a critical state $FZ_1$. Next, the input user 1 sends only the critical input data $FZ_1$ to the control unit 4. The latter is first still occupied with the processing of the input data $Z_4$. After the processing of $Z_4$, the critical input data $FZ_1$ become effective and they start a new processing cycle $4FZ_1$. At the same time, an acknowledgment signal for $FZ_1$ is sent back by the control unit 4 to the input user 1, which results in the termination of the sending out of the critical input data $FZ_1$, and by means of which the sending out of the currently applied input data $Z_{10}, Z_{11}, Z_{12}$ is continued. With the processing of the program cycle $4FZ_1$, the linkage result is transmitted from the control unit 4 to the output field device 2 as the starting data value $f(FZ_1)$, where it introduces an action based on the output data $A_0, A_1, \ldots, A_x$.

FIG. 2 represents only one embodiment example. In the example, the transmission of the input data $Z_0, Z_1 \ldots Z_x$ occurs synchronously. Furthermore, the cyclic processing of the given control programs $4Z_0$, $4Z_4$, etc., takes place more slowly than the series of the arrival of the individual input data $Z_0, Z_1$, etc.

In the operating scheme of FIG. 3, both the input processing in the field device 1 and also the control program in the control unit 4 take place asynchronously with respect to the transmission cycle. Accordingly, after $4Z_0$, the control program $4Z_1$, etc., is started, unless the input user 1 sends out critical input data $FZ_1$. Then, a critical processing cycle $4FZ_1$ is carried out, which results in the sending of an acknowledgment signal to the input user 1, and an output data value $f(FZ_1)$ to the output user 2.

When using certain bus designs as transmission device 3, it is possible to omit an explicit acknowledgment. In such a design of the transmission device 3 as a bus, the input user 1 can determine, on the basis of the continual incrementing of the running number in the transmitted message for the purpose of exactly determining a certain number of counting steps, whether a data set for a critical state has arrived in the control unit. Furthermore, in this bus, the control unit is operated in such a way that the control program is always executed between two transfers. Thus, one ensures that the critical data value set is processed by the control program of the control unit.

With FIG. 2, it has been shown that the acquisition of the input data of the field device 1 is synchronized with respect to the bus 3. However, it is also possible, to execute the control program of the control unit 4 synchronously with the operating procedure of the bus 3. In the same way, it is possible to synchronize only the control unit 4 with the bus 3, and to operate, on the other hand, the acquisition of the input data of the field device 1 asynchronously with respect to the bus 3.

The principle of the extension of the time of availability of critical data can also be used for the output user 2. In the illustration of FIG. 2 or 3, the output data values $f(FZ_1)$ were then sent out until an acknowledgment signal from the output user 2 to the control unit 4 is received.

In some safety bus systems, no extra measures are needed to extend the time of availability of critical data, because here a secure application component (function component in the control software) ensures that a return message from the user to the control unit takes place by carrying out the control.

As a transmission device between the field devices and the control unit, besides field bus installations one can also consider using Ethernet installations.

The invention claimed is:

1. Data transmission and processing system, comprising:
    at least one input user (1);
    a control unit (4) for the reception and the processing of data of the input user (1); and
    a transmission device (3) for data between the input user (1) and the control unit (4);
    where the input user (1) makes available cyclically input data values $(Z_0, Z_1 \ldots Z_x)$ to be retrieved and the transmission device (3) cyclically calls up the input data values $(Z_0, Z_1 \ldots Z_x)$, which are transmitted to the control unit (4), to be sent after processing, as output data $(A_0, A_1 \ldots A_x)$ to at least one output user (2);
    characterized in that
    parameterization means (5) with a monitoring circuit (12, 15) are provided at the input user (1), to mark input data values that characterize critical states, as critical data $(FZ_1)$, and,
    in the case of the presence of such critical states, only the associated critical data values $(FZ_1)$ will henceforth be made available for transfer, and transmitted until it is determined with certainty that the control unit (4) has received the critical data values $(FZ_1)$.

2. Data transmission and processing system according to claim 1,
    characterized in that the input user (1) represents an input field device, which presents an input memory (11) for making available the input data values $(Z_0, Z_1 \ldots Z_x)$, and a processing logic (12) for the comparison of the data made available with the critical data values $(FZ_1)$.

3. Data transmission and processing system according to claim 2,
    characterized in that the input field device (1) on the output side presents a slave switch-on unit (13), which is connected via the transmission device (3) to a master switch-on unit (41) of the control unit (4).

4. Data transmission and processing system according to claim 3 characterized in that the control unit (4) presents a processing logic (42) for the generation of output data values $(A_0, A_1 \ldots A_x)$, and in that the master switch-on unit (41) is provided for the reception of the transmission data values and the issuing of the output data values.

5. Data transmission and processing system according claim 1,
    characterized in that the control unit (4) comprises a means for calculating, upon the reception of critical data values $(FZ_1, FZ_2 \ldots)$, a critical output data value $(f(FZ_1))$, and for sending it out repeatedly to the output user (2), until it is determined with certainty that the output user (2) has received the critical output data value $(f(FZ_1))$.

6. Data transmission and processing system according to claim 5,
    characterized in that the output user (2) presents means for the formation of an acknowledgment upon receipt of a critical output data value (f(FZ$_1$)) and for sending back the acknowledgment to the control unit (4).

7. Data transmission and processing system according to claim 1,
characterized in that the output user (2) represents an output field device, which presents a processing logic (22), which transmits to an output memory (21) the output data values (A$_0$, A$_1$ ... A$_x$) delivered by the control unit (4).

8. Data transmission and processing system according to claim 7,
characterized in that the output field device (2) on the output side presents a slave switch-on unit (23), which is connected via the transmission device (3) to the master switch-on unit (41) of the control unit (4).

9. Data transmission and processing system according to claim 1,
characterized in that the transmission device (3) represents a field bus.

10. Data transmission and processing system according to claim 9,
characterized in that the field bus (3) connects a central control unit (4) to a plurality of field devices, which are formed as input field devices (1) and as output field devices (2), or as combined field devices.

11. Data transmission and processing system according to claim 1,
characterized in that the parameterization means (5) present a central memory (45) for all the parameterization data and at least one decentralized memory (15) for special parameterization data, which are tailored to the given associated field device.

12. Method to ensure the reliability of the data transmission and processing of critical data values, which originate from the input user (1), the method comprising:
a) delivering, in a cadenced or cyclic fashion, input data (Z$_0$, Z$_1$ ... Z$_x$) to a given input user (1) of a plurality of input users;
b) storing the input data (Z$_0$, Z$_1$ ... Z$_x$) for the cadenced or cyclic retrieval;
c) comparing the input data (Z$_0$, Z$_1$ ... Z$_x$) with the parameterization data for the purpose of detecting critical data values (FZ$_1$);
d) if no critical data values (FZ1) are detected, transmitting the input data (Z$_0$, Z$_1$ ... Z$_x$) to a control unit (4); and
e) if critical data values (Z$_6$=FZ$_1$) have arrived, interrupting the storage in memory of the continually delivered input data and transmitting the critical data values (FZ$_1$) to the control unit (4) until it is determined with certainty that the control unit (4) has received the critical data values.

13. Method according to claim 12,
characterized in that the control unit (4), in the case of the reception of critical data values (FZ$_1$), sends out an acknowledgment signal to the input user (4) from which the critical data values originate.

14. Method according to claim 12,
characterized in that each input user (1), for the purpose of the transmission of the input data (Z$_0$, Z$_1$ ... Z$_x$) is connected to a field bus (3), and evaluates the course of predetermined counting steps as reception of the critical data values (FZ$_1$) at the control unit (4).

15. Method according to claim 12,
characterized in that the control unit (4) establishes output data (A$_0$, A$_1$ ... A$_x$) from the transmitted input data (Z$_0$, Z$_1$ ... Z$_x$) in the predetermined cycle, and transfers them via the field bus (3) to an output field device (2).

16. Method according to claim 15,
characterized in that the control unit (4), upon reception of critical data values (FZ$_1$, FZ$_2$ ...), calculates a critical output value (f(FZ$_1$)), and sends it repeatedly to the output field device (2), until it is determined with certainty that the output user (2) has received the critical output data value (f(FZ$_1$)).

17. Method according to claim 16,
characterized in that the output field device (2), upon reception of a critical data value (f(FZ$_1$)), sends back an acknowledgment signal to the control unit (4).

18. Method according to claim 15,
characterized in that the output data (A$_0$, A$_1$ ... A$_x$) represent actuator data for output field devices (2).

19. Method according to claim 12,
characterized in that the input data (Z$_0$, Z$_1$ ... Z$_x$) represent measured data acquired at input field devices (1).

* * * * *